United States Patent
Fung et al.

(10) Patent No.: US 7,194,664 B1
(45) Date of Patent: Mar. 20, 2007

(54) METHOD FOR TRACING APPLICATION EXECUTION PATH IN A DISTRIBUTED DATA PROCESSING SYSTEM

(75) Inventors: Poon Fung, 20375 Via Volante, Cupertino, CA (US) 95014; Felix L Lam, Los Altos Hills, CA (US)

(73) Assignee: Poon Fung, Cupertino, CA (US)

( * ) Notice: Subject to any disclaimer, the term of this patent is extended or adjusted under 35 U.S.C. 154(b) by 530 days.

(21) Appl. No.: 10/657,770

(22) Filed: Sep. 8, 2003

(51) Int. Cl.
*G06F 11/00* (2006.01)
*G06F 11/30* (2006.01)

(52) U.S. Cl. .......................... 714/45; 714/32; 714/35; 717/127; 717/128

(58) Field of Classification Search ................ 714/32, 714/35
See application file for complete search history.

(56) References Cited

U.S. PATENT DOCUMENTS

| | | | | |
|---|---|---|---|---|
| 4,462,077 | A * | 7/1984 | York ........................ | 714/45 |
| 5,594,904 | A * | 1/1997 | Linnermark et al. ........ | 717/124 |
| 5,896,536 | A * | 4/1999 | Lindsey ...................... | 717/128 |
| 6,083,281 | A * | 7/2000 | Diec et al. .................. | 717/128 |
| 6,108,700 | A | 8/2000 | Maccabee et al. | |
| 6,279,002 | B1 | 8/2001 | Lenz et al. | |
| 6,311,327 | B1 * | 10/2001 | O'Brien et al. ............ | 717/114 |
| 6,539,501 | B1 * | 3/2003 | Edwards ...................... | 714/45 |
| 6,715,140 | B1 * | 3/2004 | Haga ........................... | 717/130 |
| 7,103,877 | B1 * | 9/2006 | Arnold et al. ............... | 717/130 |
| 2002/0049934 | A1 * | 4/2002 | Anderson et al. ........... | 714/45 |
| 2004/0060043 | A1 * | 3/2004 | Frysinger et al. ........... | 717/158 |
| 2004/0158819 | A1 * | 8/2004 | Cuomo et al. ............... | 717/128 |

OTHER PUBLICATIONS

Mac OS X in a Nutshell by McIntosh, Stone and Toporek, Published by O'Reilly, Jan. 2003, ISBN 0-596-00370-6.*
Microsoft SQL Server 2000 Unleashed by Rankins, Bertucci and Jensen, Published by Sams, Dec. 18, 2002, ISBN 0-672-32467-9.*
Programming Web Services with SOAP by Kulchenko, Snell and Tidwell, Published by O'Reilly, Dec. 2001, ISBN 0-596-00095-2.*

* cited by examiner

*Primary Examiner*—Scott Baderman
*Assistant Examiner*—Joseph Schell

(57) ABSTRACT

A method and a computer program product are disclosed for tracing the execution path through complex distributed applications in an n-tier client/server distributed computing environment over LAN, WAN, wireless, or the Internet. The system enables quick and pinpointed location of applications and application components along the execution path while consuming only minimal system resources. A tracing token is generated and passed from application component to application component, triggering the collection and recording of identification, timing and application data at each stage of the execution path. The tracing action may be automatically activated by the detection of some system event (such as a slow response to user requests) or be controlled manually by a system operator. The recorded data can be used to considerably speed up application analysis and problem troubleshooting.

48 Claims, 11 Drawing Sheets

METHOD FOR TRACING APPLICATION EXECUTION PATH IN A DISTRIBUTED DATA PROCESSING SYSTEM

BACKGROUND OF THE INVENTION

This invention relates to the field of troubleshooting application software problems, analyzing application operations, and gaining insight into an application environment in a distributed data processing system with cooperating applications, specifically to an efficient method for tracing the path of application execution in the complex software environment.

With the advent of packaged software applications, such as Web servers, database servers, and application servers, it gets easier and quicker to put together an application to serve a specific data processing need, as work done by others can be readily leveraged and best-of-breed applications can be utilized. As the use of computer networks become widespread, the interacting and cooperating software applications can be distributed more easily across all types of networks. Concurrently, the improvement in software integration technology, such as the latest Web Services technology, enables all kinds of software applications, modern and legacy applications alike, to be integrated into an application environment without a great deal of effort. All these technical factors result in an increasingly complex application environment where cooperating software applications or application components are distributed over a multitude of computers that in turn are distributed over a large geographic area.

As the complexity of computer networks and application environments grows, it becomes increasingly more difficult to understand the operational behavior of the application environment, and to troubleshoot functional, performance, availability, and security problems that turn up when many applications are integrated together. Specifically, it is difficult to trace the execution path—all applications or application components that are involved in a software task—through many applications in the distributed data processing environment. The difficulty shows up in all phases of a system's lifecycle including development, integration, testing, and production times. The difficulty is particularly acute when a transient production problem is encountered.

Many methods and procedures have been designed to help with the analysis and troubleshooting need. And many products are being sold in the market to address various aspects of this need. Most approaches typically suffer from two drawbacks. First, they collect a tremendous amount of measurement and monitoring data, in so doing they consume a high percentage of computer processing, storage, and communications resources in the data processing system. Secondly, to pinpoint the actual execution path or to identify the root cause of a detected problem takes a relatively long time, usually requiring a time-consuming manual effort to pore over the massive collected data in order to discover relevant data and to relate information.

Log files are a simple and common approach to obtaining operational application data. Most log files generate data on a continuous basis, and thus contain massive amounts of data. In addition, log file format varies widely across applications, making it a big challenge to even relate information from various log files. While voluminous log files consume a high percentage of system resources, their value for quickly pinpointing applications or components thereof or for locating problem sources is marginal.

Another technique is software instrumentation where existing programs are modified in order to collect additional data during a program's execution. The basic method of program instrumentation is to insert program code at various points in the original program, which gets executed together with the original program code. Instrumentation may be done at the program source code level, at the object code level, in software libraries, or at the executable program level. To use software instrumentation for tracking down problem source, one may instrument selected points in the software application hoping that the collected data may lead to the root cause. This is not easy, as it requires an analyst to come up with correct guesses in advance about where the likely causes lie. To avoid missing critical points of interest, the analyst may choose to turn on instrumentation more indiscriminately at many points. The latter approach leads to the same limitations as log files, as it generally results in an enormous amount of data that gets collected. The massive data requires tedious manual analysis in order to produce useful information; at the same time, it consumes a high percentage of system resources for its collection.

One form of software instrumentation is profiling. With profiling, one can determine which program parts run on a computer and how often, and how much time is spent in which program parts. The information a profiler collects generally includes CPU usage, memory allocation, method calls, and various timestamps on method calls. The profiler information can generally be used for identifying performance bottlenecks. But profilers typically generate even more data than log files, and are normally used for a single application, or components thereof. They are inappropriate to be used globally across many applications in a distributed data processing environment, and are definitely too slow to be used in a production environment.

Another technique to collect application information is to extend the SNMP-based (Simple Network Management Protocol) network management systems to cover software applications. SNMP is a simple protocol designed for managing device attributes and connectivity of network elements, and supports only a limited number of data types. As such, the SNMP-based network management model is unsuitable for software applications, as it lacks the capability to model complex relationships among applications.

Some APIs (Application Program Interfaces) have been designed to enable application programs to pass application data to an SNMP network management system. The notable API examples include ARM (Application Response Measurement) by HP and Tivoli, and JMX (Java Management Extension) of the Java J2EE application server platform. But the API technique is still limited by the network element model of SNMP and thus provides no direct means for pinpointing applications or for identifying application-level problem sources.

U.S. Pat. No. 6,108,700, entitled "Application end-to-end response time measurement and decomposition", describes an elaborate method for measuring the response time of an end-user request and decomposing the overall response time into segments representing contributions from participating applications in a distributed data processing environment. While the method enables the identification of transaction components that introduce delays or faults, its use will likely incur significant system resource overhead due to its complexity.

Thus there is a need for an efficient method that provides direct information on operation or problem location of software applications which incurs minimum system overhead.

BRIEF SUMMARY OF THE INVENTION

Accordingly, an aspect of the present invention provides a method for identifying application components along an execution path through a complex distributed application environment that incurs minimal system resources overhead.

An aspect of the present invention provides a method for direct and pinpointed location of application components along an execution path through a complex distributed application environment that does not require an effort to pore over a massive amount of collected data.

An aspect of the present invention automatically identifies application components along the program execution path in response to some system event.

An aspect of the present invention automatically traces the program execution path along which a system problem takes place.

An aspect of the present invention quickly and automatically locates the root cause of an application problem in a complex distributed application environment.

An aspect of the present invention provides useful application data from application components along the program execution path an aid in application analysis and problem troubleshooting.

For the above aspects, the method according to the present invention installs monitoring code in application components that looks for a tracing token when the application component starts execution. When a tracing token appears, data collection and recording are triggered. In addition, the tracing token is relayed to the next application component that gets invoked. Thus application data is collected only when it is needed and only in application components along the program execution path. The highly selective data collection process results in greatly reduced system resource usage yet provides a system analyst with relevant and useful data for analysis and troubleshooting.

Further objects, aspects, features, and advantages of the present invention will become apparent from a consideration of the drawings and ensuing description.

DETAILED DESCRIPTION OF THE INVENTION

The present invention is directed to an efficient method for analyzing application operations or troubleshooting application problems in a multi-tier distributed application environment using a dynamic tracing technique. As noted above, there is a need for providing a method for quickly and automatically identifying all applications involved in a system operation or in the occurrence of a problem in a distributed application environment. This is accomplished in the present invention by tracing all applications and application components along the execution path where a problem is detected. The tracing function is triggered and performed by monitoring code installed into the applications, or components thereof, which incurs only minimal system resource overhead.

The unit of monitoring is an application component which includes application programs, plug-in programs, program extensions (such as filters), static library programs, dynamic library programs, and program scripts. An application component may be as large as a standalone application program, or as small as a routine, or function, or procedure, in a program or a library. For example, a program library may have many of its routines instrumented with monitoring code, each being treated as an individual application component.

Figure 1:
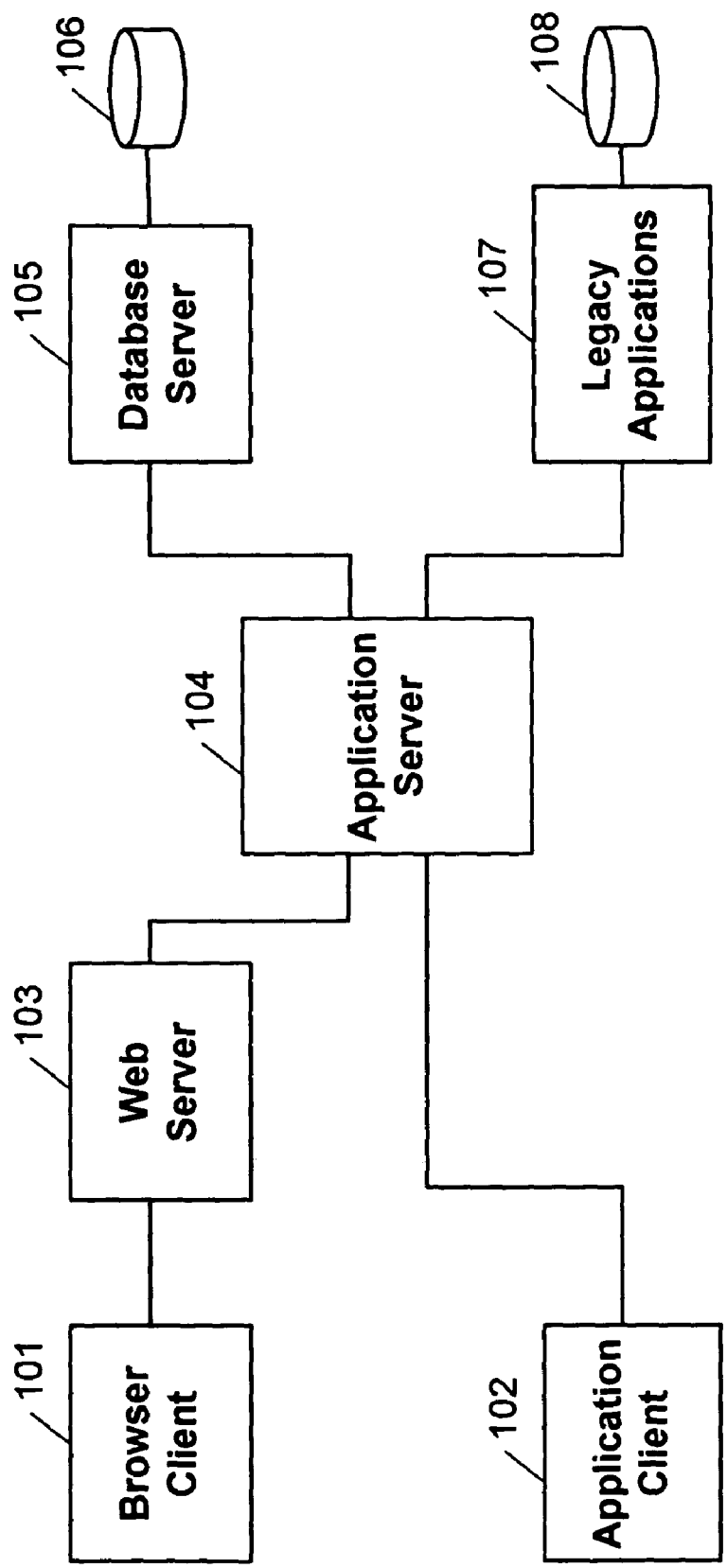
FIG. 1 shows the block diagram of an example multi-tier distributed data processing system.

FIG. 1 shows an example of a multi-tier application architecture with which the features of the present invention can interact to produce information. As depicted, client applications 101 and 102 can initiate a request and access an application server 104 which, after analyzing the request, can accesses a database server 105 or other backend legacy applications 107 for information or data needed for the client request. In the case of the web browser client 101, the web server 103 relays the request from web client 101 to the application server 104. Both clients 101 and 102 are responsible for presentation logic and interface to their respective end users. The database server 105 and legacy application 107 process the request and access their respective databases 106 and 108. The application server 104 is responsible for business rules and data manipulation. Having an independent application layer decouples business logic from presentation logic and database functions, both physically and in the software architecture.

Referring to FIG. 1, client applications 101 and 102, the web server 103, the application server 104, the database server 105, and the legacy application 107 are typically distributed over many different computers interconnected through various types of computer network. The partitioning of software functions in a multi-tier architecture and the distribution of hardware servers make it easier to integrate new applications into an existing data processing environment and considerably improve system flexibility, reliability, and scalability. However, the distribution of hardware and software functions also significantly increases the complexity of the data processing system. As a result, it becomes increasingly difficult to diagnose functional and performance problems in such an architecture.

Figure 2A:
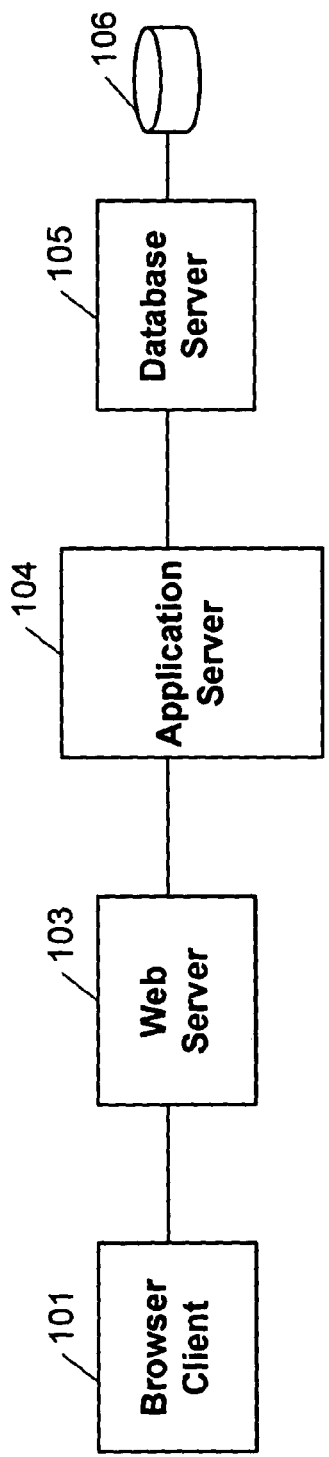
FIG. 2A shows a simplified version of FIG. 1 in an e-commerce application which may be utilized to implement the method of the present invention.
Figure 2B:
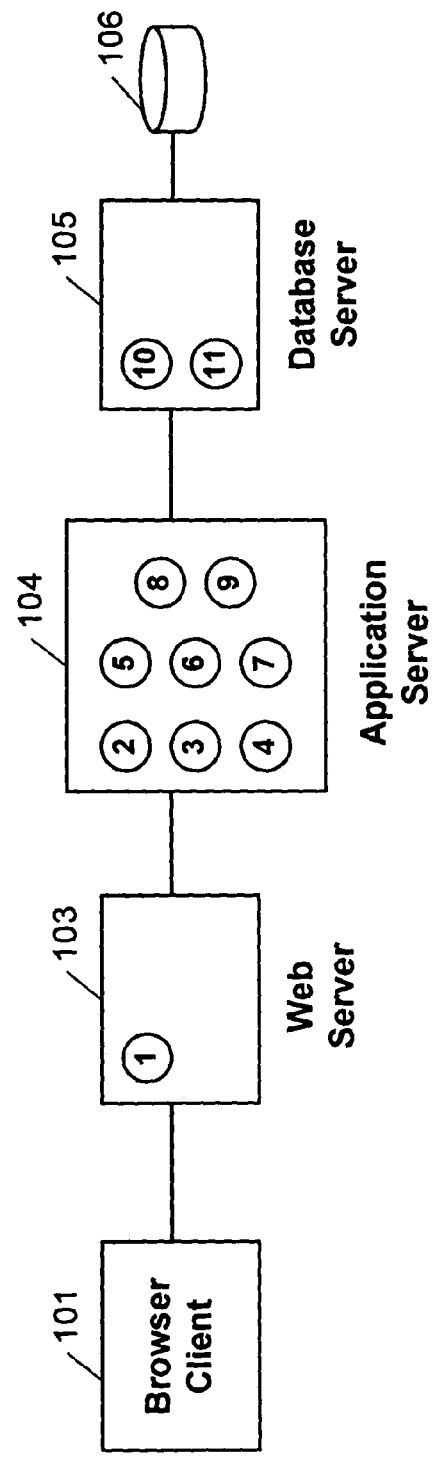
FIG. 2B shows an expanded view of FIG. 2A with the addition of application components with installed monitoring code.

FIGS. 2A and 2B show an example of application monitoring according to the present invention. FIG. 2A shows a typical architecture of an e-commerce example, which is a simplified version of FIG. 1. Here an end user through the browser client 101 accesses a web application. The web application comprises static and dynamic web pages hosted on the web server 103. Static pages requested from the browser client 101 are served directly by the web server 103 from its repository. Dynamic page requests are forwarded to the application server 104, which analyzes the client request and generates a response via program code hosted on it. In the process of generating a response, the program code on the application server 104 may make one or more query to the database server 105. While the application architecture in FIG. 2A looks straightforward, the physical implementation usually involves a large number of software applications running on many server machines. For example, there are usually a large number of web server machines used for load balancing. There are frequently also many application server machines specializing in various application functions as well as for load balancing. In addition, the hardware machines are typically distributed over many physical locations interconnected by local area networks (LAN), wide area networks (WAN), wireless networks or the Internet. Thus when a problem occurs in this complex data processing system, be it performance, availability, or security, it is very difficult to pinpoint the source of the problem. It is also difficult for a system administrator to get an insight into what goes on in the distributed system.

FIG. 2B depicts the system of FIG. 2A including features of the present invention for software monitoring. As we can see, some numbered nodes have been placed in the web server 103, the / server 104 and the database server 105. These numbered nodes are application components with monitoring code installed in them.

Techniques for installing monitoring code vary from application component to application component. Examples include inserting software code into source code of an application component, inserting software code into object code or byte code of an application component, inserting software code into executable code of an application component, installing filters (Microsoft Internet Information Server), installing loadable modules (Apache Web Server), and intercepting library calls to shared static and dynamic software libraries. Exact functions for installed monitoring code also vary from application component to application component, but they all perform some common tasks as depicted in FIG. 3.

Figure 3:
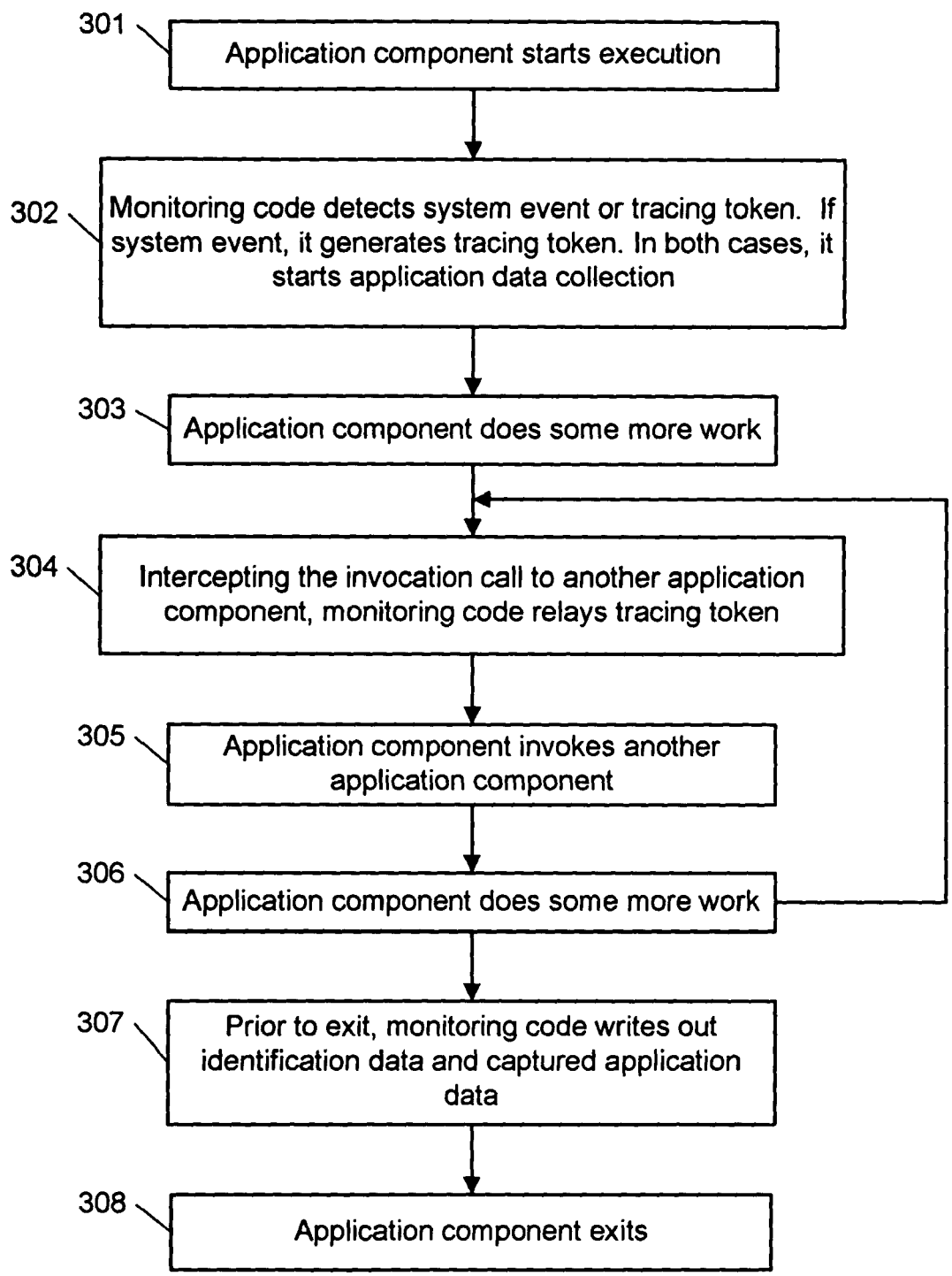
FIG. 3 shows a flow chart illustrating processing steps in an application component with installed monitoring code.
Figure 7:
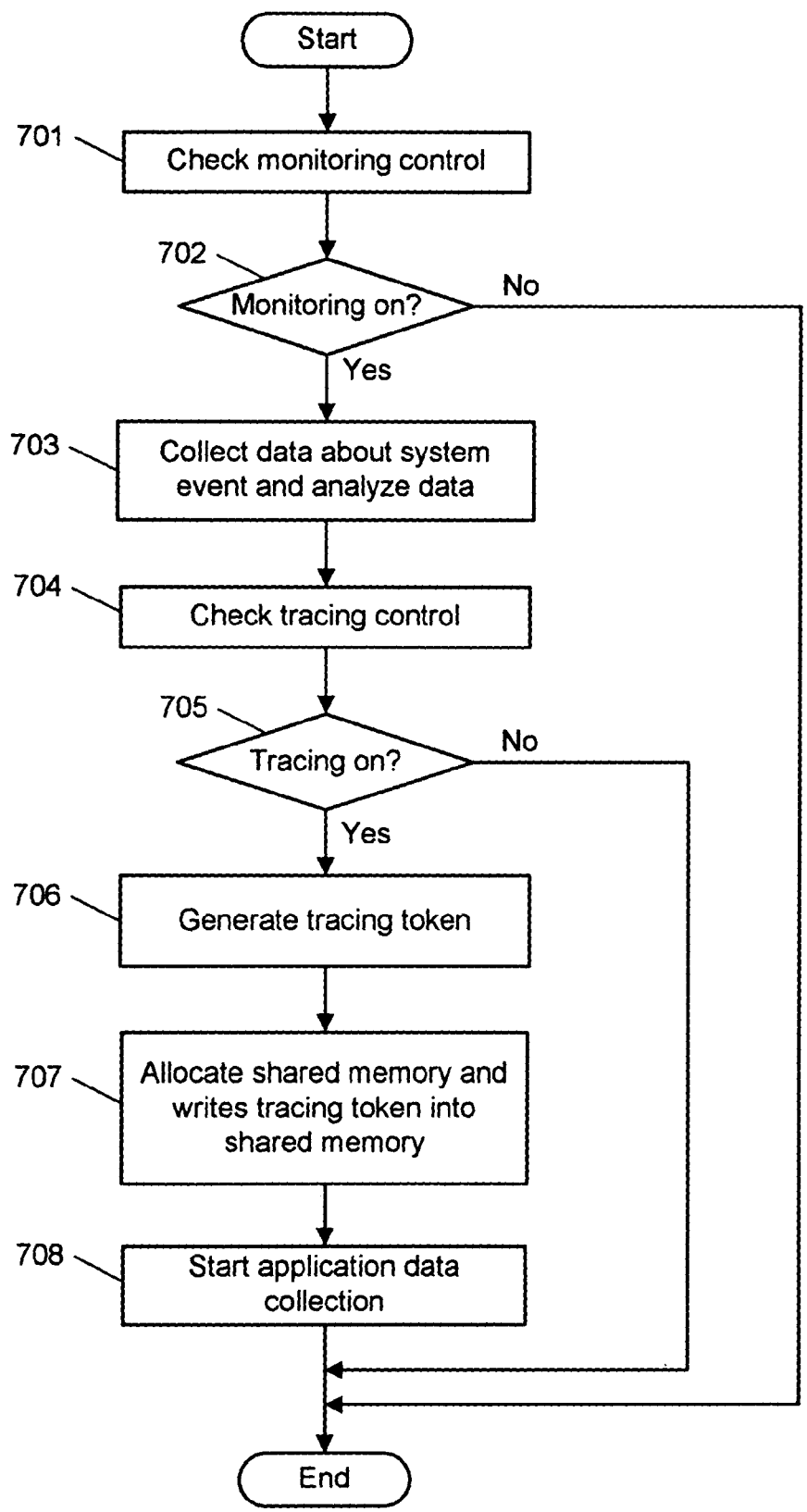
FIG. 7 shows a flow chart illustrating steps for system event detection and tracing token generation and relaying for an entry interceptor.
Figure 9:
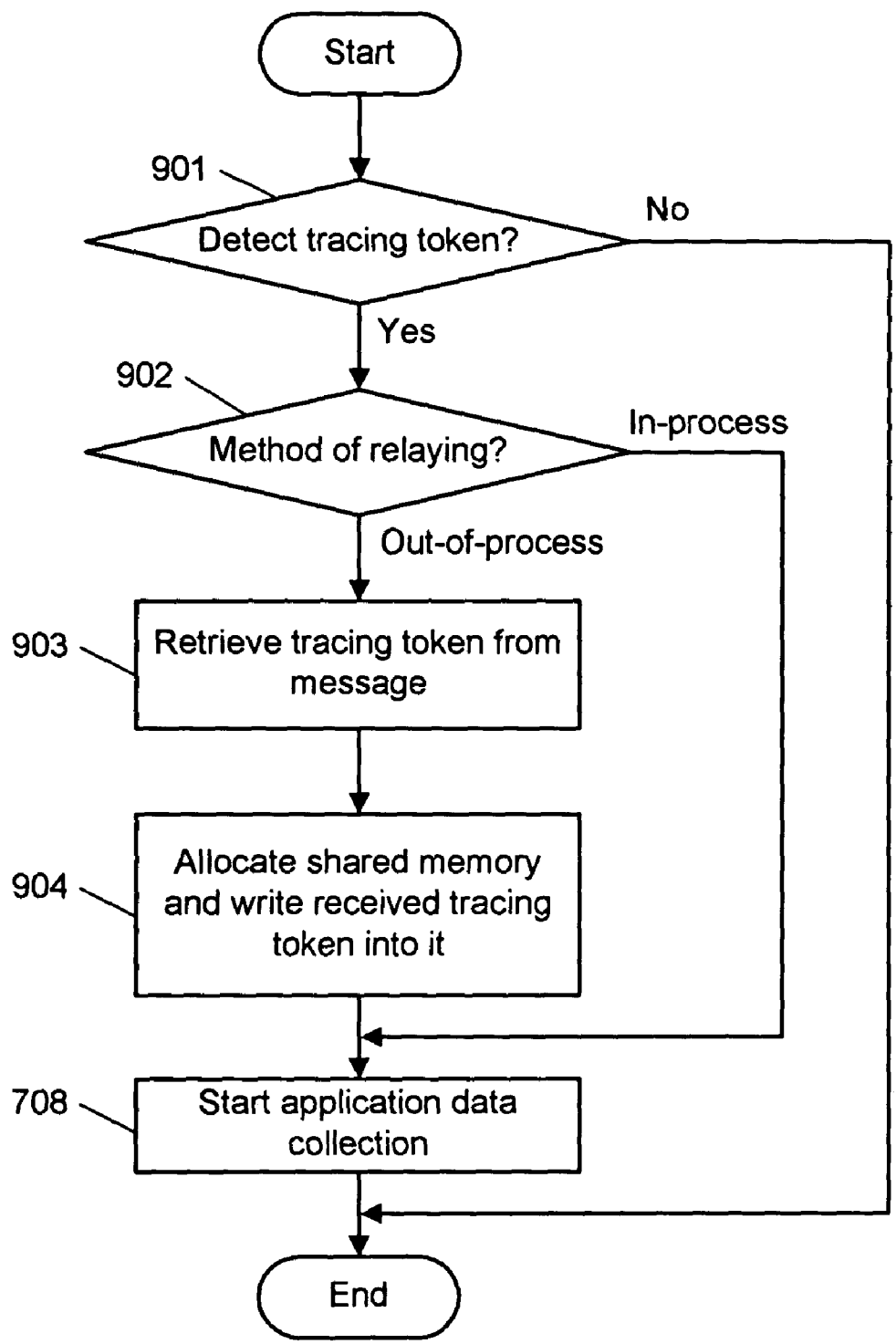
FIG. 9 shows a flow chart illustrating steps for tracing token detection and relaying for an internal interceptor.

FIG. 3 shows the general flow of execution that takes place in an application component with installed monitoring code. As shown, three steps in the flow chart are performed by the installed monitoring code; these are steps 302, 304, and 307. The rest of steps are performed by the application component. Thus upon entry to the application component 301, the monitoring code tries to detect either a system event or a tracing token 302. The distinction between the detection of a system event and the detection of a tracing token will be made in detail later (FIGS. 7 and 9). In the case of a system event, the monitoring code generates a tracing token. In both cases, it starts the collection of application data 302. Then the monitoring code returns control to the application component which proceeds to perform its functions 303. During the execution of the application component, if it has to invoke another application component, the installed monitoring code intercepts the invocation call and relays the tracing token to the application component being invoked in step 304. Then the invocation call is executed in step 305. As control is returned to the application component in step 306, it proceeds to do some more work. Steps 304 through 306 may be repeated multiple times. Finally, the application component is ready to exit. But there is monitoring code installed at the exit part of the application component which writes out the captured application data as well as data for identifying the tracing token, hardware server, application component, and timestamp for purposes of logging and analysis 307 (see FIG. 11 for example data record). Then the application component exits 308. Referring to FIG. 3, we shall hereinafter refer to the collection of installed monitoring codes in steps 302, 304, and 307 as an interceptor that has been installed into an application component.

There are two types of interceptors: entry interceptor and internal interceptor. Entry interceptors detect system events, while internal interceptors detect tracing tokens (FIGS. 7 and 9). System events measure what is taking place in the data processing system, such as client request response times or system resource (e.g., CPU, memory, disk, servers) utilization levels, but tracing tokens are created in accordance with the present invention. When an entry interceptor detects the occurrence of a system event for which it is programmed to detect, it triggers a tracing action by generating a tracing token and relays it when the next application component is called. An internal interceptor installed in the next application component detects the tracing token and relays it to yet the next application component. Thus all application components along the execution path in a complex data processing system are traced. In addition, all interceptors along the execution path will collect and record valuable application data as shown in steps 302 and 307. As mentioned before, there may be multiple entry interceptors or multiple internal interceptors placed in the same software application system. For example, a Java application server system may include many library functions, all of which may have installed internal interceptor code.

Figure 4A:
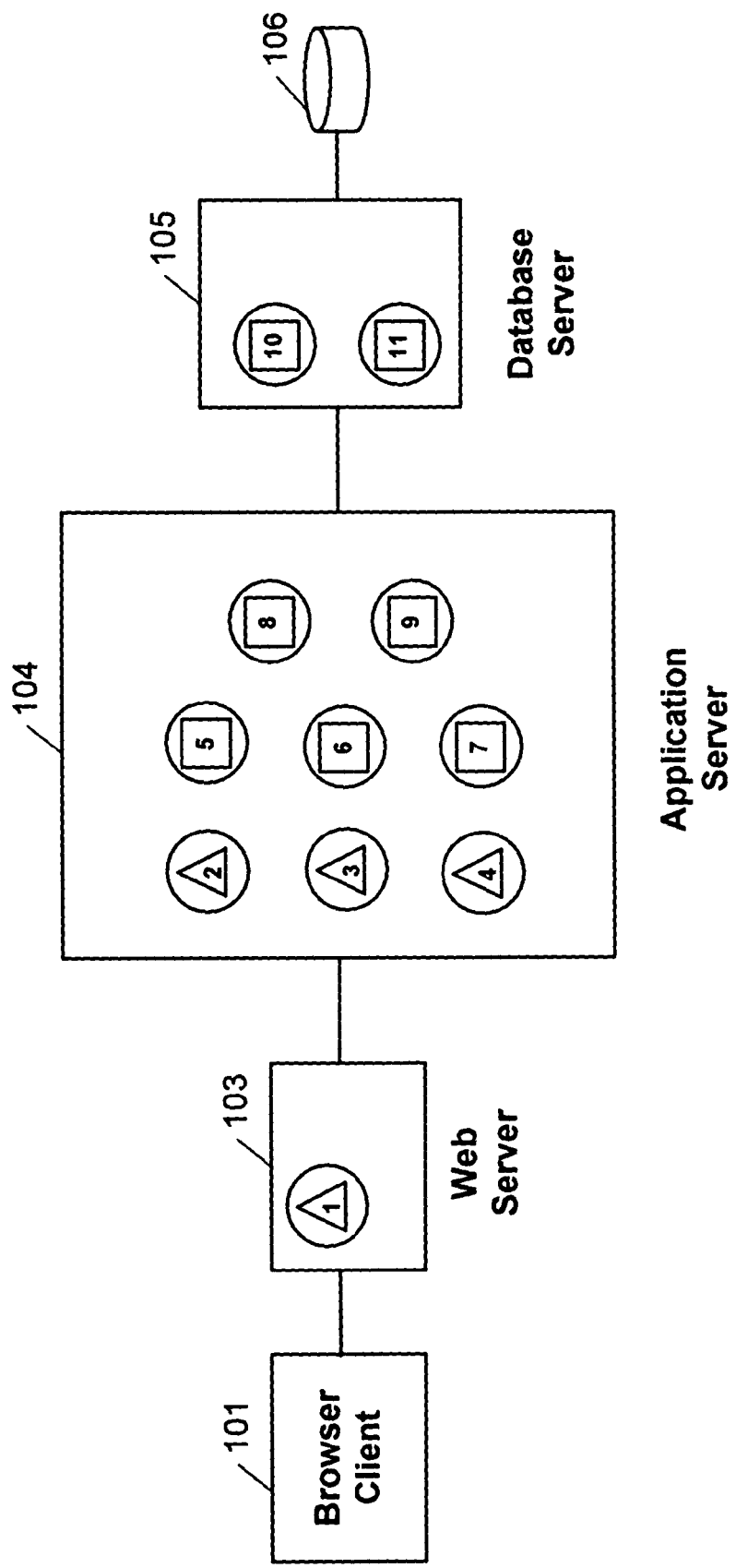
FIG. 4A shows a refined view of FIG. 2B further distinguishing entry interceptors and internal interceptors.

The system of FIG. 2B is redrawn in FIG. 4A where the numbered nodes representing application components are further detailed. As shown, some nodes are drawn with an embedded triangle, while others are shown with an embedded rectangle. Nodes with an embedded triangle represent application components with installed entry interceptor code. Similarly, nodes with an embedded rectangle represent application components with installed internal interceptor code. Thus nodes 1 through 4 function as entry interceptors, and nodes 5 through 11 function as internal interceptors.

To facilitate discussion, we shall refer to an interceptor installed in a node by the node's number also. Thus the entry interceptor in node 1 will be referred to as entry interceptor 1, and so forth. As in the example shown in FIG. 4A, entry inceptor 1 has been installed in the web server 103 for monitoring the performance of static pages. Entry interceptors 2, 3, and 4 have been installed in the application server 104 for monitoring dynamic page performance. In an embodiment, these include Java servlets dynamic JSP (Java Server Page) pages. Internal interceptors 5 through 9 have been installed in the application server 104. These correspond to various application components which, in the preferred embodiment, include Enterprise Java Bean components (session beans and entity beans) that implement various business logic. Internal interceptors 10 and 11 have been installed in the database server 105 to monitor various SQL (Structured Query Language) query performance. Other common places in the preferred embodiment for installing interceptors—entry or internal—include Java Database Connectivity (JDBC) API (application program interface), SOAP (Simple Object Access Protocol) handlers, and various APIs on a J2EE (Java 2 Enterprise Edition) application server platform.

Figure 4B:
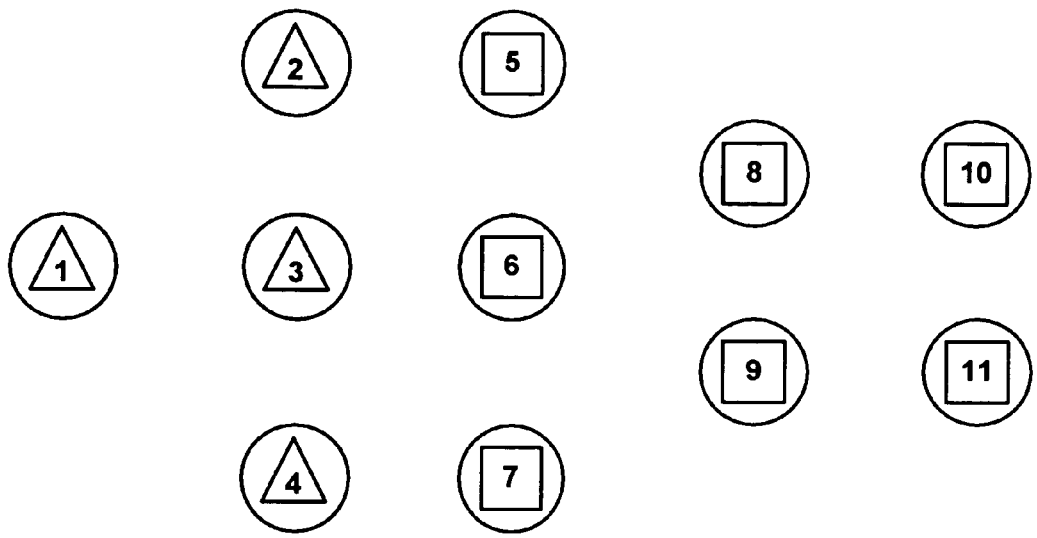
FIG. 4B shows a simplified version of FIG. 4A with only the entry and internal interceptors.
Figure 4C:
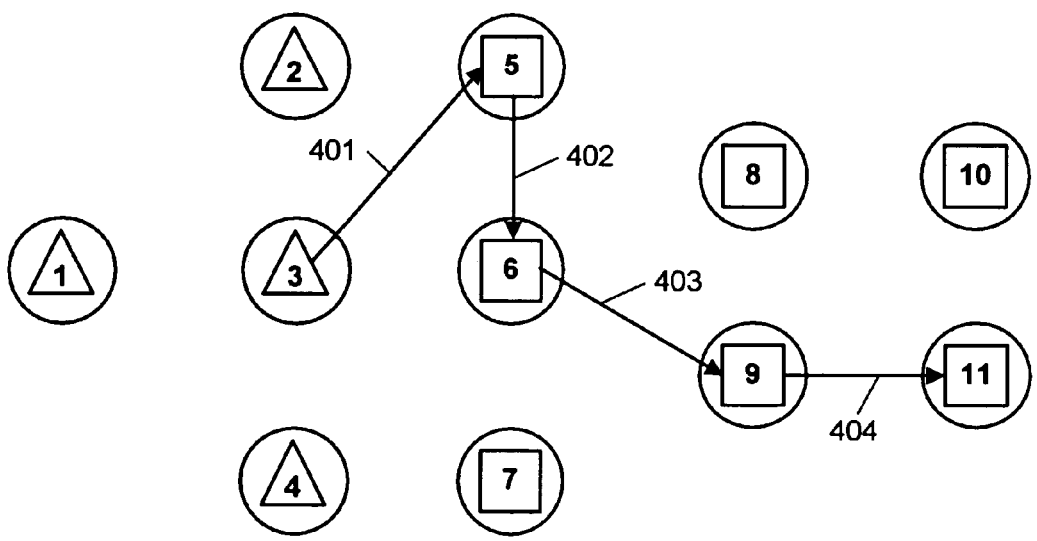
FIG. 4C shows the tracing token relaying feature according to the present invention in the example of FIG. 4B.

To simplify discussion further, the system of FIG. 4A is redrawn in FIG. 4B with only the numbered nodes representing application components. But keep in mind that application components in FIG. 4B may be distributed over a wide geographic area. In this example, suppose node 3 is a Java servlet serving a certain dynamic web page. Node 3 has an installed entry interceptor. Suppose also that the purpose of entry interceptor 3 is to monitor the response time of a client request. Further suppose that in the course of system operation entry interceptor 3 detects that the request response time exceeds some pre-determined threshold (i.e., the system event entry interceptor 3 is programmed to look for has happened). Upon detecting the response time degradation, entry interceptor 3 generates a tracing token and relays to the next application component that gets invoked. This action is shown in FIG. 4C in the arrow 401 going from node 3 to node 5. Node 5 is an EJB component with an installed internal interceptor that detects the tracing token and relays it 402 to the next component that gets invoked, which is node 6. Likewise, node 6 is another EJB component with an installed internal interceptor. Internal interceptor 6 detects the tracing token and further relays it 403 to the next component, node 9. Node 9 is a JDBC API function with an installed internal interceptor. Internal interceptor 9, in turn, detects the tracing token and relays it 404 to the next component that gets invoked, which is node 11 in the database server with an installed internal interceptor to monitor database query performance. Internal interceptor 11 detects the tracing token but does not relay it further. Thus the path connecting nodes 3, 5, 6, 9, and 11 by arrows 401, 402, 403, and 404 forms the dynamic execution path through the distributed application system. This path identification is triggered by the detection of a system event—a response time problem—at the entry interceptor installed in node 3. This example also illustrates a feature of the present invention that a trace of application components can be automatically produced when an entry interceptor (in this case, node 3) detects a system event. In addition to tracing the dynamic execution path, monitoring codes in all these interceptors also record application and identification data 307 for online and offline analysis.

As mentioned before, in an e-commerce system like the one shown in FIG. 2A or other large distributed data processing systems as shown in FIG. 1, there are usually a large number of web servers, application servers and application software systems interconnected by various networks. Thus when a problem occurs in a complex distributed data processing system, the dynamic tracing feature in accordance with the present invention makes it possible to identify application components and hardware servers automatically and in a pinpointed fashion. In addition, application data collected along the execution path will also provide a system analyst with valuable and deeper insight into the system's operation, as the analyst no longer needs to pore over an enormous mass of data in an attempt to locate hardware and software components that are relevant to the system's operations or that cause the system's problem.

A tracing token is used to uniquely identify a trace through the data processing system and thus can be a universally unique identifier (UUID) or some variation of it. To start a trace, a tracing token is generated or created by an entry interceptor. The trace is produced when the tracing token is relayed and received by other internal interceptors along the execution path as depicted in FIG. 4C.

There are two techniques that can be used to relay a tracing token from an entry interceptor to an internal interceptor, or from one internal interceptor to another. These are in-process relaying and out-of-process relaying.

Figure 5:
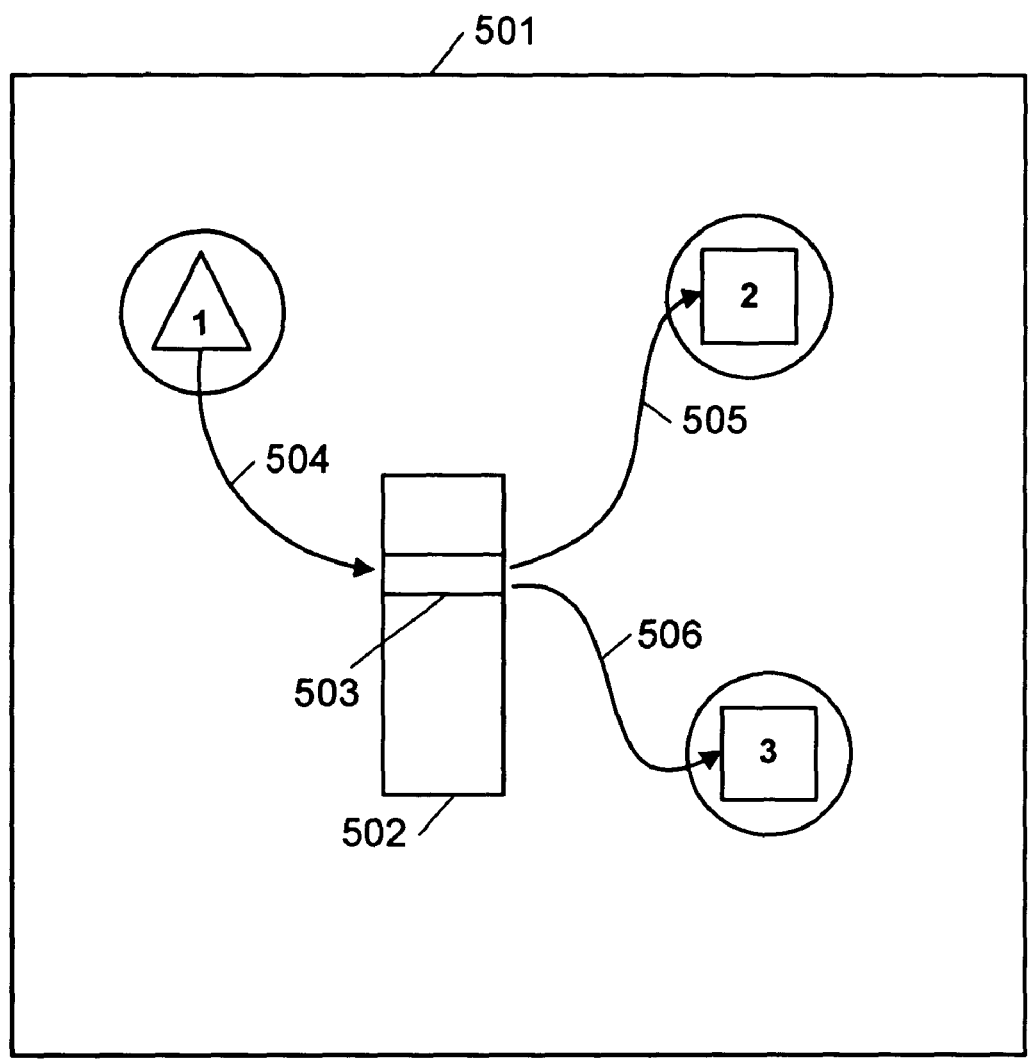
FIG. 5 shows a pictorial representation of in-process relaying of tracing token through shared memory.

In in-process relaying, two interceptors are installed into application components that execute within the same software process or thread, and therefore share the same address space. Thus the two interceptors can access the same address space and a shared memory area. Since a memory area exists for sharing by all interceptors within the same process, it can be used as a place into which a tracing token can be written and from which the tracing token can be read. FIG. 5 shows an example of in-process relaying. In FIG. 5 we use the same numbered node notation as in FIGS. 4A–4C where a triangular shape embedded in a circle represents an entry interceptor and a rectangular shape embedded in a circle represents an internal interceptor. Thus interceptor 1 is an entry interceptor, and interceptors 2 and 3 are internal interceptors. The rectangular boundary 501 represents a software process in which all application components (the circles) and installed interceptors (triangle and rectangles) execute. The box 502 represents the shared memory area accessible to interceptors 1, 2 and 3, which holds an allocated area 503 for a tracing token. As shown, entry interceptor 1 writes 504 a tracing token into the allocated area 503, while internal interceptor 2 reads 505 the tracing token from the allocated area 503 at a later time. Internal interceptor 3 reads 506 the tracing token from the allocated area 503 at yet a later time.

If two interceptors execute in two separate software processes, then they generally do not share common memory. In the case where the two processes run on different computers, effective means for sharing memory between them is generally not available. Thus the two processes commonly communicate by messages or streams. Likewise, out-of-process relaying of a tracing token makes use of inter-process messages or streams also, but in a non-intrusive manner such that the inclusion of a tracing token in a message or stream will not disturb normal operations of the bearer of the message or stream, the underlying transport, or the handler at the receiving end. Generally, a tracing token is inserted into appropriate points in a data stream or is attached to a message.

Figure 6A:
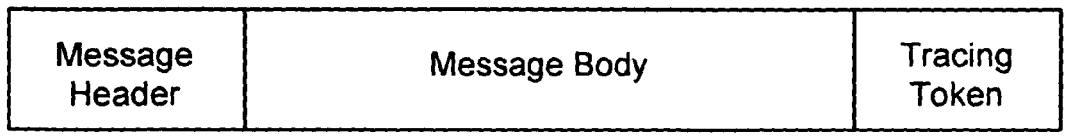
FIG. 6A shows an example of an inter-process message with an added area to carry a tracing token for out-of-processing relaying.

Depending upon the application component, different non-intrusive methods are available for attaching a tracing token to a message. In many cases, an area at the end of a message may be allocated for holding the tracing token. This example is shown in FIG. 6A. This structure can be used to relay tracing tokens between two processes from an entry interceptor to an internal interceptor, or between two internal interceptors.

Figure 6B:
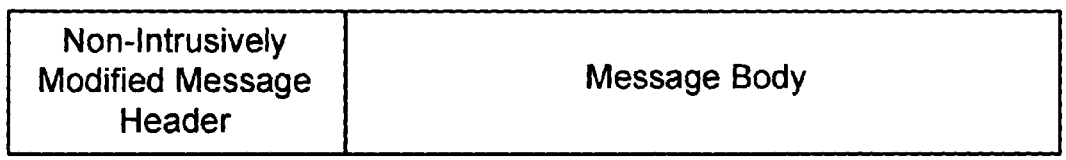
FIG. 6B shows an example of an inter-process message with a message header non-intrusively modified to carry a tracing token for out-of-processing relaying.

In some cases where there is provision in the message header for the non-intrusive insertion of new data, a tracing token can be appropriately inserted into the message header, resulting in a non-intrusively modified message header. This approach can be used in application components with a Web Services interface that communicates with SOAP over an HTTP (HyperText Transfer Protocol) transport or a JMS (Java Message Service) transport. Since a SOAP transport header over HTTP can accommodate new fields, and a SOAP transport header over JMS can accommodate new properties, a tracing token carried this way will be non-intrusive. An example of this approach is depicted in FIG. 6B.

Figure 6C:
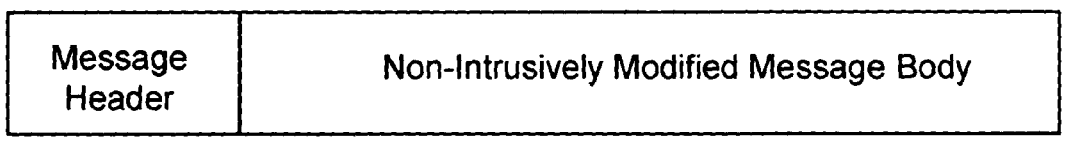
FIG. 6C shows an example of an inter-process message with a message body non-intrusively modified to carry a tracing token for out-of-processing relaying.

In other cases where there is provision in the message body for the non-intrusive insertion of new data, a tracing token can be appropriately inserted into the message body, resulting in a non-intrusively modified message body. For example, this approach can be used to insert a tracing token as a comment in an SQL statement that is compliant with the SQL-92 standard. Since an embedded SQL comment does not alter the syntax or semantics of an SQL statement, inserting a comment is the non-intrusive way to relay a tracing token in an SQL query. By inserting a tracing token as a SQL comment, a non-intrusively modified SQL statement can tunnel through any database connector, driver, or library such as Microsoft's ODBC (Open Data Base Connectivity), JDBC (Java Data Base Connectivity), or IBM DB2 CLI (Call Level Interface). FIG. 6C depicts an example of this approach.

As discussed earlier, FIG. 3 depicts the general flow of execution that takes place in an application component with installed monitoring code. In particular, monitoring codes in steps 302, 304, and 307 constitute an interceptor. FIGS. 7 through 10 provide more details for steps 302 and 304. For simplicity, FIGS. 7 through 10 only reference inter-process messages for out-of-process relaying of a tracing token; treatments for data streams are similar.

FIG. 7 expands step 302 for the case of an entry interceptor. As its name suggests, an entry interceptor is placed at a location considered to be an entry point for client enquiries to a complex distributed data processing system such as an n-tier client/server distributed computing system. Examples include locations in the web server 103 to monitor the performance of serving static page, and locations in Java servlets in the application server 104 to monitor the performance of serving various dynamic pages. Referring to FIG. 7, the entry interceptor starts by checking to see if monitoring needs to be performed in step 701. The monitoring control in step 701 allows for the activation and deactivation of monitoring. The data for monitoring control may be programmed into an entry interceptor or provided externally manually by an operator or through a system management system of the data processing system. The result of step 701 is tested in 702. If monitoring has been deactivated, the entry interceptor exits. If monitoring is to be performed, the entry interceptor proceeds to step 703 in which it collects data about the system event for which it has been programmed to detect. System events measure what is taking place in the data processing system, such as client request response times or system resource utilization levels. For example, data may be collected on the of response time of a client request to an e-commerce system. After data collection and analysis, the entry interceptor checks tracing control in step 704. The collected data may indicate the system event being monitored has been detected and thus trigger tracing, or the collected data may cause tracing to be stopped. Tracing control is elaborated in FIG. 8. Based on the analysis in step 704, a decision is made about whether tracing should start in step 705. If tracing starts, a tracing token is generated in step 706. A tracing token is a unique identifier and will serve to uniquely identify the trace or execution path. The entry interceptor then allocates a shared memory and writes the newly generated tracing token into it in step 707. The shared memory is used to relay tracing token from interceptor to interceptor during tracing if interceptors executes in the same software process as depicted in FIG. 5. Then application data collection is initiated in step 708. Application data that gets collected depends on the application component in which an interceptor is installed. Memory usage data, lengths of software queues, or variable values within an application component are examples of application data that may be useful for analysis.

Referring to step 705 of FIG. 7, if the monitored system event has not been detected, and thus no tracing is to be started, the entry interceptor simply exits. This feature of the present invention is especially noteworthy in troubleshooting applications, as in a normally running system there are likely no system problems most of the time, hence no system events detected, and hence no tracing and no unnecessary trace data collection. By triggering tracing and saving data only when problems are detected in the system, the present invention has the feature of consuming only minimal system resource overhead. On the other hand, when a problem is detected, the collected application data in step 708 will be most helpful to a system analyst troubleshooting the cause of a system problem.

Figure 8:
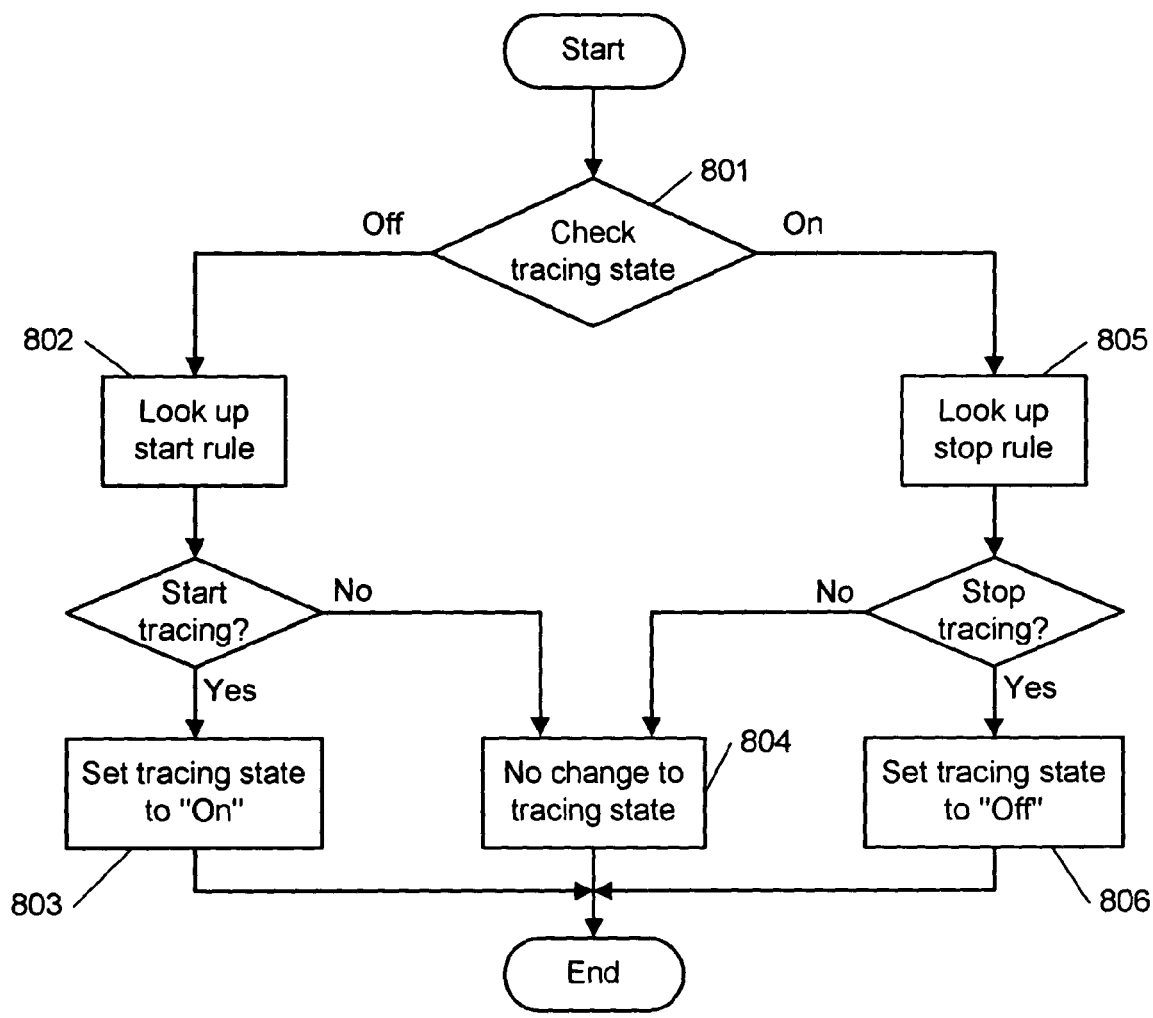
FIG. 8 shows a flow chart illustrating steps for tracing control for an entry interceptor.

FIG. 8 depicts the tracing control that determines whether tracing should be triggered or stopped by an entry interceptor in step 704. The tracing control maintains a start rule and a stop rule. The start rule determines when the interceptor goes from no tracing to tracing, and the stop rule performs the opposite function. Together, the start and stop rules provide fine-grained control over the tracing action. For example, one start rule may indicate that tracing should start as soon as the monitored client response time exceeds some pre-determined threshold. A more sophisticated start rule may require tracing only if the client response time exceeds some pre-determined threshold x number of times within y number of minutes, thereby smoothing out fluctuations. A stop rule example may indicate that tracing should stop as soon as a previously slow client response time returns to a normal range. An alternative stop rule may require tracing to stop only after the previously slow client response time has returned to normal continuously for x number of minutes. The start and stop rules may be programmed into the monitoring code of an entry interceptor, or they may be specified in some external system configuration that can be dynamically modified manually or through a system management system.

Referring to FIG. 8, the tracing control performs its task by maintaining an internal tracing state for the entry interceptor, which is checked in step 801. If no tracing was performed before, the tracing state should be in the "off" state. In such case, data collected about the system event in step 703 is compared against the start rule in step 802. If the start rule indicates that tracing should be triggered, the tracing state is turned to "on" in step 803. Otherwise, there is no change to the tracing state 804. Returning to step 801, if tracing was performed the last time the entry interceptor was executed, the tracing state should be in the "on" state. Then data collected about the system event in step 703 is compared against the stop rule in step 805. If the stop rule indicates that tracing should be stopped, the tracing state is turned to "off" in step 806. Otherwise, the tracing state remains "on" for tracing to continue.

FIG. 9 expands step 302 for the case of an internal interceptor. Whereas an entry interceptor is programmed to detect a system event, an internal interceptor is programmed to detect a tracing token. While the operation of monitoring and tracing in an entry interceptor are managed with monitoring control and tracing control in steps 701 and 704, the management of tracing in an internal interceptor is considerably simpler—it only looks for the existence of a tracing token. The appearance of a tracing token triggers the tracing action in an internal interceptor 901. Since a tracing token may be attached to different parts of a received message (FIGS. 6A–6C), the action in step 901 must find the tracing token at the right place in the received message, such as at the end of the message, in the message header, or in the message body. If a tracing token is detected, the internal interceptor performs different actions dependent upon how the tracing token has been relayed to it 902. If the tracing token is relayed from out of process, thus coming with a received message, the internal interceptor will place the tracing token in a shared memory so that it can be relayed to other internal interceptors within the same software process. To this end, the internal interceptor retrieves the tracing token from the received message 903, allocates a shared memory, and writes the tracing token into it 904. If the tracing token is passed within the same process, thus coming in a shared memory, steps 903 and 904 are bypassed. Then application data collection is initiated in step 708 as it is for an entry interceptor.

Figure 10:
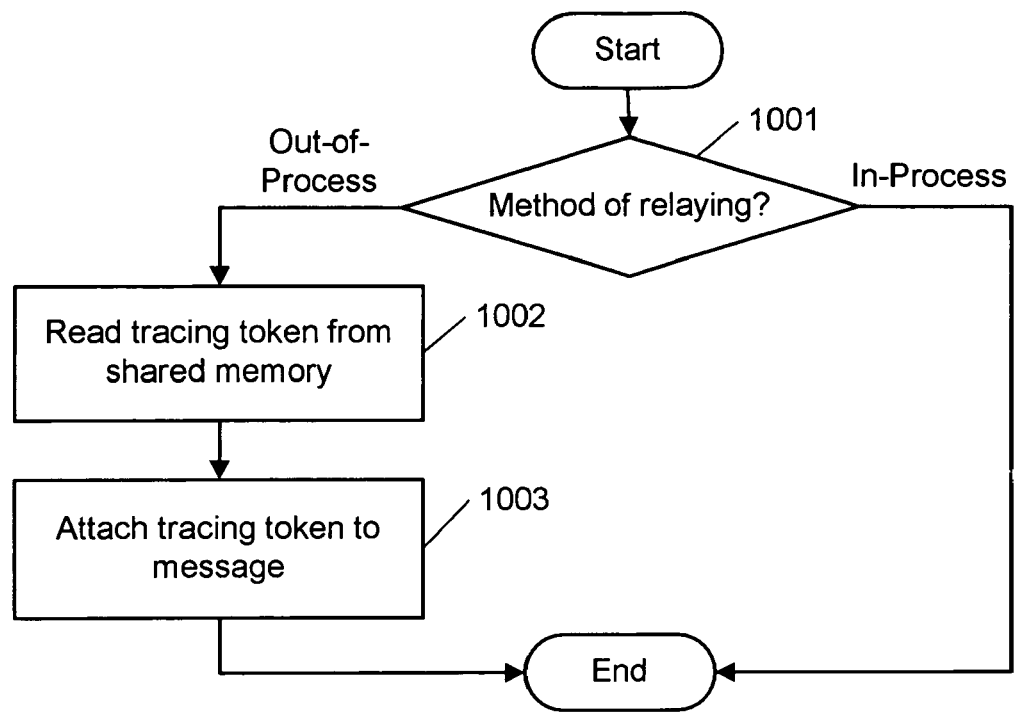
FIG. 10 shows a flow chart illustrating steps for tracing token relaying for all interceptors.

FIG. 10 expands step 304 for both entry interceptor and internal interceptor on the relaying of a tracing token. As shown in FIGS. 5 and 6A–6C, there are two ways to relay a tracing token: in-process relaying an out-of-process relaying. In in-process relaying, the tracing token is passed through a common memory shared by two interceptors (entry interceptor or internal interceptor). In out-of-processing relaying, the tracing token is attached to a message (or inserted in a data stream) that is being sent from one application component to another. Thus in step 1001, a decision is made to determine how a tracing token is to be relayed. In the case of in-process relaying, nothing needs to be done as a shared memory has already been allocated and is holding the tracing token. In the case of out-of-process relaying where a tracing token is passed by attaching to a message, the tracing token is read from the shared memory 1002 and attached to the message that is being sent between application components 1003. Since there are multiple ways to attach a tracing token in an inter-process message (FIGS. 6A–6C), the action in step 1003 will attach the tracing token in the right place of the message, such as at the end of the message, in the message header, or in the message body. As the message is received by the other application component, the internal interceptor installed in it will intercept the message and retrieve the attached tracing token in step 903.

Figure 11:
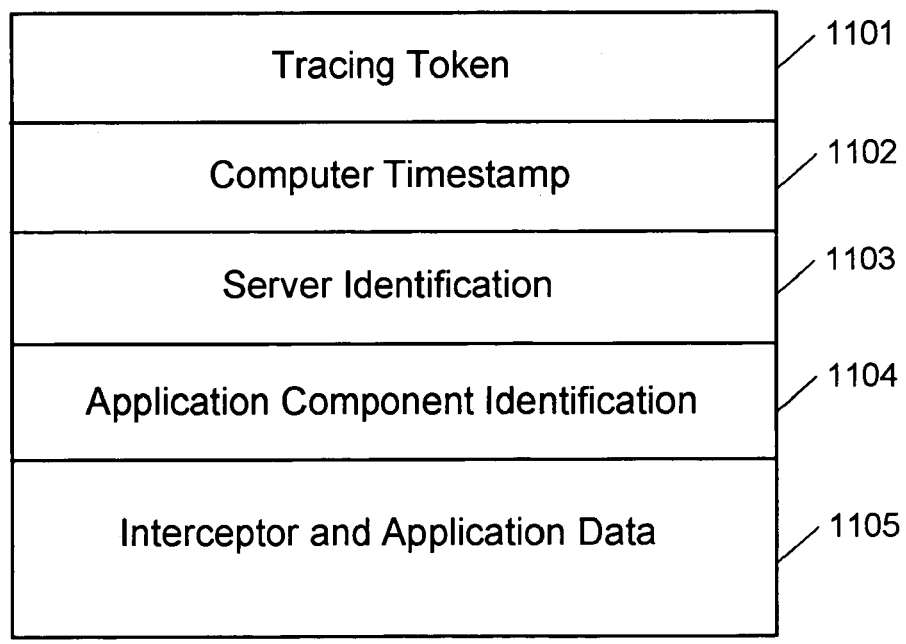
FIG. 11 shows an example of a data record written by an entry or internal interceptor.

FIG. 11 depicts the structure of an example data record written by an entry interceptor or by an internal interceptor in step 307 of FIG. 3. This type of data record is written by an entry interceptor that detects a system event and relays a tracing token, and by all internal interceptors that detect the tracing token being relayed. Thus these records capture the essential information about all application components along an execution path triggered by some system event in a distributed data processing system. When these data records are collected, combined, and analyzed, a system analyst will have all the relevant information for analyzing a system's operations or for troubleshooting a system's problem. These data records may be written into files, registries, relational databases, object databases, or other storage means directly by an interceptor or through a system management system.

The example data record shown in FIG. 11 includes five fields. The value of the tracing token is records in the first field 1101. The tracing token is universally unique and is common across all data records along a trace or execution path. Thus it is used for correlating all data records written by interceptors along a trace. Field 1102 holds a computer timestamp read locally from the server machine in which the application component runs. Field 1103 provides identifying information for the server machine. The field 1104 captures identifying information about the application component into which an interceptor is installed. This may include application name, module name, method name, and the like. Field 1105 includes any interceptor and application data that may be helpful for a troubleshooting or analysis exercise. Examples of application data include dynamic page response time measured at a Java servlet and the number of threads at a Java EJB component. An entry interceptor may include a description of the system event that triggers the tracing in Field 1105 also.

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

What is claimed is:

1. A computer implemented method for tracing an execution path through application components distributed over at least one computer in a data processing system, comprising:
   providing a plurality of interceptors installed in a plurality of application components, wherein each application component has at least one interceptor;
   receiving a plurality of requests to said data processing system, wherein processing each request by said data processing system produces an execution path traversing at least one application component;
   for a first interceptor, intercepting a first operation at a first application component;
   for the first interceptor, determining if tracing an execution path associated with said first operation is desired,
   for the first interceptor, if tracing said execution path associated with said first operation is desired, performing a first trace function, wherein said first trace function comprises:
      generating a tracing token ;
      activating data collection at said first interceptor; and
      relaying said tracing token;
   for a second interceptor, intercepting a second operation at a second application component;
   for the second interceptor, detecting said tracing token; and
   for the second interceptor, if said tracing token exists, performing a second trace function, wherein said second trace function comprises:
      activating data collection at said second interceptor; and
      relaying said tracking token.

2. The method of claim 1, wherein said application components include at least one of application programs; plug-in programs, program extensions, static library programs, dynamic library programs, program scripts, and individual modules, or subroutines, or functions, or procedures, or methods thereof.

3. The method of claim 1, wherein said application components reside in the same computer, or are distributed over multiple computers interconnected by at least one of a local area network, a wide-area network, a wireless network, or the Internet.

4. The method of claim 1, wherein said determining if tracing an execution path associated with said first operation is desired utilizes a start rule and a stop rule.

5. The method of claim 1, wherein said tracing token comprises a unique value in said data processing system, said unique value uniquely identifies a particular request.

6. The method of claim 5, wherein said unique value is a universally unique identifier (UUID).

7. The method of claim 1, wherein said relaying of said tracing token is accomplished through at least one of reading and writing of a shared memory, attachment to an inter-process message, and insertion into a data stream.

8. The method of claim 1, wherein said relaying said tracing token step at said first interceptor comprises inserting said tracing token in an inter-process message, said detecting said tracing token step at said second interceptor comprises reading said inter-process message to retrieve said tracing token, and said tracing token is detected when said tracing token is found in said inter-process message.

9. The method of claim 1, wherein said relaying said tracing token step at said first interceptor comprises writing said tracing token to a data stream, said detecting said tracing token step at said second interceptor comprises reading said data stream to retrieve said tracing token, and said tracing token is detected when said tracing token is found in said data stream.

10. The method of claim 1, wherein said relaying said tracing token step at said first interceptor comprises storing said tracing token in a shared memory location accessible by said second interceptor, said detecting said tracing token step at said second interceptor comprises reading said share memory location to locate said tracing token, and said tracing token is detected when said tracing token is found in said shared memory location.

11. The method of claim 1, wherein said tracing an execution path through application components takes place in at least one of system production time, system development time, system integration time, or system testing time of said data processing system.

12. The method of claim 1, wherein said generating a tracing token is automatically triggered by detection of a system event.

13. The method of claim 12, wherein said detection of a system event is dynamically activated and deactivated.

14. The method of claim 13, wherein said dynamic activation and deactivation of said detection of a system event are controlled internally in said one of said application components, or externally to said one of said application components.

15. The method of claim 12, wherein said system event includes at least one of an event relating to system and application performance, system and application availability, system and application troubleshooting, or system and application security.

16. The method of claim 1, wherein said first application component and said second application component are the same.

17. The method of claim 1, wherein said first application component and said second application component are different.

18. The method of claim 17, wherein said first application component and said second application component run in the same process on a computer.

19. The method of claim 17, wherein said first application component runs in a first process and said second application component runs in a second process, and said first process and said second process are different.

20. The method of claim 19, wherein said first process runs on a first computer and said second process runs on a second computer, and said first computer and said second computer are connected to a network.

21. The method of claim 1, wherein said first interceptor intercepts a function call of said first application program.

22. The method of claim 1, wherein said first interceptor intercepts a function call of an operating system.

23. The method of claim 1, wherein said second interceptor intercepts a function call of said second application program.

24. The method of claim 1, wherein said second interceptor intercepts a function call of an operating system.

25. The method of claim 1, wherein a decision of whether to trace an execution path is made by said first interceptor.

26. The method of claim 1, wherein said first interceptor initiates tracing of an execution path.

27. The method of claim 1, wherein data collected at said first interceptor and data collected at said second interceptor are stored in a database.

28. The method of claim 1 further comprising:
for a third interceptor, intercepting a third operation at a third application component;
for the third interceptor, detecting said tracing token; and
for the third interceptor, if said tracing token exists, performing a third trace function, wherein said third trace function comprises:
activating data collection at said third interceptor; and
relaying said tracking token.

29. A computer implemented method for tracing an execution path through application components distributed over at least one computer in a data processing system, comprising:
installing first monitoring code in a first plurality of said application components for detecting system events;
installing second monitoring code in a second plurality of said application components for detecting tracing tokens, wherein said tracing tokens are generated by said first monitoring code, and said second monitoring code is different from said first monitoring code;
detecting one of said system events, activating data collection, and generating and relaying one of said tracing tokens in one of said first plurality of said application components, wherein said one of said tracing tokens comprises a unique identifier uniquely identifying said execution path;
detecting and relaying said generated one of said tracing tokens to activate data collection in at least one of said second plurality of said application components along said execution path through said application components in said data processing system; and
recording said collected data from all said application components along said execution path through said application components in said data processing system.

30. The method of claim 29, wherein said first plurality of said application components includes entry points for client enquiries to an n-tier client/server distributed computing system.

31. The method of claim 29, further comprising the step of providing storage means for said collected data for all said application components along said execution path through said application components in said data processing system.

32. The method of claim 31, wherein said storage means includes at least one of files, registries, relational databases, or object databases.

33. The method of claim 29, wherein a record of said collected data includes at least one of:

the value of one of said tracing tokens;
the value of a computer's timestamp;
the identifier of a computer;
the identifier of one of said application components;
the description of one of said system events; or
application data from operation.

34. The method of claim 29, wherein said monitoring code is installed in at least one of source code, object code, executable code, or application extension mechanism of said application components.

35. A computer program product comprising a computer usable medium having computer readable program code means embodied therein for tracing an execution path through application components distributed over at least one computer in a data processing system, the computer readable program code means in said computer program product comprising:
    computer readable program code means for installing first monitoring code in a first plurality of said application components for detecting system events;
    computer readable program code means for installing second monitoring code in a second plurality of said application components for detecting tracing tokens, wherein said tracing tokens are generated by said first monitoring code, wherein said second monitoring code is different from said first monitoring code;
    computer readable program code means for detecting one of said system events, activating data collection, and generating and relaying one of said tracing tokens in one of said first plurality of said application components, wherein said one of said tracing tokens comprises a unique identifying said execution path;
    computer readable program code means for detecting and relaying said generated one of said tracing tokens to activate data collection in at least one of said second plurality of said application components along said execution path through said application components in said data processing system; and
    computer readable program code means for recording said collected data from all said application components along said execution path through said application components in said data processing system.

36. A method of selectively tracing application program execution paths comprising:
    providing a plurality of interceptors installed in at least one application program;
    at a first interceptor, controlling start of tracing an execution path;
    at the first interceptor, when said start of tracing said execution path is granted, performing a first trace function at said first interceptor, wherein said first trace function comprises:
        generating a tracing token, wherein said tracing token comprises a unique identifier;
        activating data collection at said first interceptor; and
        transmitting said tracing token to at least one interceptor on said execution path;
    at a second interceptor, receiving said tracing token; and
    at the second interceptor, when said tracing token is received, performing a second trace function at said second interceptor, wherein said second trace function comprises:
        activating data collection at said second interceptor; and
        transmitting said tracing token to at least one interceptor on said execution path.

37. The method of claim 36, wherein said controlling start of tracing said execution path at said first interceptor further comprising:
    providing said first interceptor having a trace variable;
    examining said trace variable; and
    starting a trace when said trace variable is set.

38. The method of claim 37 further comprising:
    monitoring at least one system event at said first interceptor; and
    for each monitored system event, performing the following:
        when said trace variable is not set, evaluating at least one start rule on said monitored system event and setting said trace variable according to the outcome of said evaluation of said start rule; and
        when said trace variable is set, evaluating at least one stop rule on said monitored system event and setting said trace variable according to the outcome of said evaluation of said stop rule.

39. The method of claim 36, wherein said first interceptor and said second interceptor run in a process on a computer, and said tracing token is transmitted from said first interceptor to said second interceptor via shared memory.

40. The method of claim 36, wherein said first interceptor runs in a first process and said second interceptor runs in a second process, and said first tracing token is transmitted from said first interceptor to said second interceptor via inter-process communication.

41. The method of claim 36, wherein said first interceptor is installed in a first application program and said second interceptor is installed in a second application program.

42. The method of claim 41, wherein said first application program runs on a first computer and said second application program runs on a second computer.

43. A method of selectively tracing application program execution paths comprising:
    monitoring response time on servicing a request at a first interceptor;
    controlling tracing of an execution path on subsequent invocations of said first interceptor using at least one response time measurement at said first interceptor, wherein setting a trace variable on said first interceptor when tracing said execution path commences on subsequent invocations of said first interceptor and resetting said trace variable on said first interceptor when tracing said execution path does not commence on subsequent invocations of said first interceptor; and
    tracing a particular execution path of a particular request when said trace variable on said first interceptor is set, wherein said tracing step comprises:
        for said first interceptor, generating a tracing token, collecting data into a database, and relaying said tracing token, wherein said tracing token comprises a unique identifier uniquely identifies said particular request; and
        for a second interceptor, receiving and relaying said tracing token, and collecting data into said database.

44. The method of claim 43, wherein said relaying said tracing token by said first interceptor comprises writing said tracing token to a shared memory location accessible by said second interceptor and said receiving said tracing token by said second interceptor comprises reading said tracing token at said shared memory location.

45. The method of claim 43, wherein said first interceptor runs in a first process and said second interceptor runs in a second process, and said relaying said tracing token by said first interceptor and said receiving said tracing token by said second interceptor are accomplished using inter-process communication.

46. A method of tracing application program execution paths comprising:
- providing a first interceptor and a second interceptor on an execution path, wherein said first interceptor is a first interception point on said execution path;
- generating a tracing token at said first interceptor, wherein said tracing token uniquely identifies said execution path;
- relaying said tracing token from said first interceptor to said second interceptor;
- collecting a first trace data at said first interceptor, wherein said first trace data includes said tracing token;
- collecting a second trace data at said second interceptor, wherein said second trace data includes said tracing token;
- correlating said first trace data with said second trace data using said tracing token; and
- reconstructing said execution path using said first trace data and said second trace data.

47. The method of claim 46, wherein said relaying said tracing token from said first interceptor to said second interceptor is performed using shared memory.

48. The method of claim 46, wherein said relaying said tracing token from said first interceptor to said second interceptor is performed using inter-process communication.

* * * * *